Patented Feb. 20, 1940

2,191,394

UNITED STATES PATENT OFFICE 2,191,394

CARBOXYLIC ACID AMIDES OF THE CYCLOPENTANOPOLYHYDROPHENANTHRENE SERIES

Karl Miescher, Riehen, and Albert Wettstein, Basel, Switzerland, assignors to the firm of Society of Chemical Industry in Basle, Basel, Switzerland No Drawing. Application November 18, 1938, Serial No. 241,276. In Switzerland March 17, 1938

4 Claims. (Cl. 260—397)

This invention relates to the manufacture of cyclopentanopolyhydrophenanthrene - carboxylic acid amides or the free acids by treating a free or esterified α-hydroxynitrile of the cyclopentanopolyhydrophenanthrene series with an acid and if desired subsequently with an alkaline agent.

Suitable parent materials are obtained, for example, by the action of hydrogen cyanide on a carbonyl compound containing the steroid skeleton. In carrying out this condensation it is often an advantage that there should be present a small proportion of a substance of basic action, for instance an alkali hydroxide or an alkaline earth hydroxide or a carbonate or bicarbonate of either of these, an alkali salt of a feeble organic acid, for instance an alkali cyanide, an organic base or the like. The cyanohydrine thus obtained (see S. Kuwada & Miyasaka, Journ. pharmac. Soc. Japan, vol. 57, page 96 (1937)) may be converted before the treatment of the present invention into the more stable and therefore more easily purified esters by the action of an esterifying agent; for instance, they may be converted into the α-acyloxy compounds or the α-halogen-compounds. The parent material may be derived from any compound of the cyclopentanopolyhydrophenanthrene series, for example from androstane, pregnane, oestrane, their stereoisomerides, derivatives and homologues, and may be for the rest saturated or mono- or poly-unsaturated. The nitrile group or groups may be united directly to the nuclear skeleton or may be separated therefrom by one or more carbon atoms; the free or esterified hydroxyl groups in α-position are of tertiary or secondary nature.

The process comprises treating the parent material in substance, in solution or in suspension with an acid agent, for instance a mineral acid, such as a hydrogen halide, sulfuric acid or phosphoric acid or an acid salt, an inorganic acid anhydride, a strong organic acid, for instance formic acid or the like. Suitable solvents or diluents are for example alcohols, ethers, chlorinated hydrocarbons, for instance chloroform, ethylene chloride or chlorobenzene; also acetic acid, hydrocarbons or the like. The most favourable conditions for the reaction may be ascertained in each case by a simple preliminary experiment depending upon the product desired, for instance it may be desirable to conduct the process at ordinary or raised or lowered temperature or pressure or both. In the present process the nitrile is converted into the acid amide or into the free carboxylic acid group. Besides remaining reactive atomic groups may be changed, for example free or esterified hydroxyl groups, especially those in α-position, may be re-esterified, saponified and/or eliminated in the form of acid or water or (in case the process is conducted under reducing conditions, for instance in the presence of hydrogen iodide and phosphorus) exchanged for hydrogen.

The products obtained by the action of acid agents may finally be treated in the crude form, or after they have been separated and purified, with an alkaline agent. For this purpose the hydroxide of an alkali-metal or alkaline earth metal or a carbonate of either metal in absolute or aqueous alcohol or a metal alcoholate or the like may be used. In this manner by a comparatively gentle action parent material which has not been changed may be split into its fundamental carbonyl compounds and these may be removed for example by taking advantage of their greater solubility or by means of carbonyl reagents and further used in synthesis. Quite generally in this manner ester groups, especially secondary ester groups, may easily be saponified, whereas the saponification or elimination of tertiary ester groups (accompanied by reformation of free hydroxyl or formation of a new double linking) generally requires somewhat more energetic conditions. Energetic action may serve especially for finally converting acid amide groups which may be present into carboxylic acids.

Both the treatment with acid and that with alkaline agent may be conducted in stages, the several stages being conducted under the same or varied conditions, for example α-acetoxy-carboxylic acid amides obtained from α-acetoxy-nitriles by means of an acid agent may easily be separated from by-products by the gentle action of an alkaline agent; by energetic alkaline saponification they may be converted into α-hydroxycarboxylic acid amides and finally under strongly alkaline conditions of reaction the latter become α-hydroxycarboxylic acids. By the action of powerful acid agents for eliminating water there may be obtained from the corresponding α-hydroxycarboxylic acid amides unsaturated amides (and finally by means of alkalis unsaturated acids) or under reducing, acid conditions α-desoxycarboxylic acids.

By the invention therefore there may be obtained α-acyloxy-, α-hydroxy-, α-halogen, α-desoxy- or α,β-unsaturated carboxylic acids of the cyclopentanopolyhydrophenanthrene series or their amides. These substances are very important intermediate products in the manufacture of therapeutically valuable compounds, especially having reactivity of corpus luteum hormone or of the hormone of the suprarenal capsule cortex.

The following examples illustrate the invention, the parts being by weight:

Example 1

1 part of t-dehydro-androsterone-cyanohydrin-diacetate of melting point 215 to 217° C. is dissolved in 3 parts of chloroform and after addition of 3 parts of alcoholic hydrochloric acid solution of 50 per cent. strength the mixture is kept in a closed vessel at room temperature for 2 days, whereby crystallisation occurs. The whole is now poured into water, chloroform is removed at a low temperature in a vacuum and the crude product thus obtained is filtered with suction. It is finally heated under reflux for 2 hours with a solution of 0.7 part of potassium hydroxide in 50 parts of methanol and the alkaline solution is then poured into water. The flocks thus precipitated are filtered with suction, washed with normal alkali lye and then with water, sharply dried and then extracted twice, each time with 50 parts of boiling hexane. By concentrating the hexane solution some t-dehydroandrosterone may be recovered. The alkaline filtrate yields on acidification and extraction with ether a crystallised acid fraction which melts at 250° C., may be recrystallized from acetone and consists of $\Delta^5$-3,t,17-dihydroxy-aetiocholenic acid or its 17-acetate.

The chief fraction insoluble in hexane is recrystallized from acetone or methanol and/or sublimed in a high vacuum (0.01 mm.) at 240° C., in this manner pure $\Delta^5$-3.t.17-dihydroxy-aetiocholenic acid amide of melting point 295 to 296° C. is obtained. The same compound is obtained for instance by allowing the original reaction mixture to stand for about 8 days at 0° C. or by starting from a mixture of 17 isomeric cyanohydrin esters instead of from a pure t-dehydro-androsterone - cyanohydrin - diacetate. By standing over night in acetic anhydride and pyridine it yields a 3-mono-acetate which sublimes quickly already at 220° C. under 0.001 mm. pressure; when this is recrystallised from dilute acetone it melts at about 269 to 270° C.

The crude dihydroxy acid amide which is obtainable may with advantage be used directly for the saponification to the carboxylic acid described in Example 2. It appears to contain still a small proportion of $\Delta^5$-3,t-hydroxy-17-acetoxy - aetiocholenic acid amide. When either of the said acetates is heated for 6 hours under reflux with a solution of 10 per cent strength of sodium hydroxide in methyl alcohol of 90 per cent strength, it becomes, with formation of only a quite small proportion of acid, the aforesaid $\Delta^5$-3,t,17-dihydroxy-aetiocholenic acid amide.

Example 2

1 part of t-dehydroandrosterone-cyanohydrin-diacetate, 3 parts of ethylene chloride, 1.5 parts of ethyl alcohol and 1.5 parts of hydrogen chloride are together heated in a sealed tube for 3 hours at 60° C. The clear hardly colored solution is then poured into water. The ethylene chloride evaporated in the vacuum and the supernatant water decanted from the reaction product. The latter is heated for 2 hours to boiling with 50 parts of a methanol solution of 20 per cent. strength of caustic soda, the solution is poured in water and the precipitated flocks filtered, washed with normal caustic soda lye and water and dried in a vacuum. The dry substance is extracted at boiling temperature twice, each time with 50 parts of hexane, and the portion which is insoluble in hexane is recrystallized from acetone. The beautiful needles thus obtained are the $\Delta^5$-3,t,17-dihydroxy-aetio-cholenic acid amide already described in Example 1. They melt at 294 to 296° C. with decomposition.

0.5 part of this compound, together with the small acid fraction obtained by the treatment with alkali is heated with 50 parts of a 2-n-solution of sodium hydroxide in n-propyl alcohol of 95 per cent strength for 5 hours in the oil bath at 120° C. under reflux. The whole is then poured into water and the alkaline solution is extracted with ether. The ethereal solution is washed with n-caustic soda lye and the united alkaline phases are acidified and extracted with ether. This ethereal solution yields a residue from which by recrystallisation from acetone the $\Delta^5$-3,t,17-dihydroxy-aetio-cholenic acid is obtained in the form of quite fine strongly electrical small needles which melt with decomposition at 267 to 268° C. This saponification may also be conducted instead of with sodium hydroxide and propyl alcohol for example by boiling for 10 hours with an alcoholate solution made from 1.2 parts of sodium and 20 parts of propyl alcohol.

Instead of the two alkaline treatments described above, the product of the acid treatment may be saponified energetically with alkali and thus converted directly to the dihydroxy acid. Crude dihydroxy acid preparations may also be purified with advantage by way of the methyl ester and its mono-acetate.

Example 3

1 part of t-dehydroandrosterone-cyanohydrin-diacetate is allowed to stand for 10 days at room temperature with 3 parts of chloroform and 3 parts of alcoholic hydrochloric acid containing 1.5 parts of hydrogen chloride; the whole is then heated under reflux for half an hour at 70° C., whereby a crystalline precipitate is produced. Water is added, the chloroform is evaporated in a vacuum and the supernatant water is decanted from the precipitate. The latter is heated for 2 hours under reflux with 30 parts of a methanolic solution of 30 per cent strength of caustic soda, the whole is then poured into water and the precipitated flocks are filtered, washed with n-caustic soda lye and water and dried. The dry matter is then extracted with a little boiling hexane and recrystallized from acetone and/or sublimed at 200° C. in a high vacuum. There is thus obtained in brilliant hexagonal crystals a product which is strongly hygroscopic and essentially more freely soluble than the acid amide derivatives hitherto described. It melts at 254 to 258° C. with decomposition and has probably the constitution of a $\Delta^{5,16}$-3,t-hydroxy-aetio-choladiene acid amide.

What we claim is:

1. The carboxylic acid amides of the saturated and unsaturated cyclopentanopolyhydrophenanthrene series, containing in $\alpha$-position to the substituted carboxyl group a member of the group consisting of a free and an esterified hydroxyl group.

2. The saturated and unsaturated aetiocholenic acide amides, containing in 3- and in 17-position a member of the group consisting of a free and an esterified hydroxyl group.

3. $\Delta^5$-3,t,17-dihydroxy-aetiocholenic acid amide.

4. $\Delta^5$-3,t-acetoxy-17-hydroxy-aetiocholenic acid amide.

KARL MIESCHER.
ALBERT WETTSTEIN.